United States Patent [19]
Burckhardt et al.

[11] Patent Number: 4,552,028
[45] Date of Patent: Nov. 12, 1985

[54] DEVICE FOR MEASURING FORCE

[76] Inventors: Christof W. Burckhardt, Avenue du Chateau 20, 1020 Renens; Philipp Stauber, Chemin du Saléve 15, 1004 Lausanne; Gérard Piller, Chemin de la Crésentine 51, 1023 Crissier, all of Switzerland

[21] Appl. No.: 578,065

[22] Filed: Feb. 8, 1984

[30] Foreign Application Priority Data

Feb. 23, 1983 [CH] Switzerland ............... 1002/83

[51] Int. Cl.[4] .................... G01L 1/14; G01L 5/16
[52] U.S. Cl. ................... 73/862.04; 73/862.64; 361/283
[58] Field of Search ........... 73/862.04, 862.05, 862.06, 73/862.62, 862.64, 780; 177/210 C; 361/278, 283

[56] References Cited

U.S. PATENT DOCUMENTS

| 2,855,779 | 10/1958 | Zaid | 338/5 X |
| 4,168,518 | 9/1979 | Lee | 73/862.64 X |
| 4,369,663 | 1/1983 | Venturello et al. | 73/862.04 |
| 4,384,496 | 5/1983 | Gladwin | 73/862.04 |

FOREIGN PATENT DOCUMENTS

| 0069073 | 1/1983 | European Pat. Off. | 73/862.04 |
| 0731190 | 6/1955 | United Kingdom | 73/862.64 |
| 1453934 | 10/1976 | United Kingdom | 177/210 C |
| 0741074 | 6/1980 | U.S.S.R. | 73/862.04 |

Primary Examiner—Charles A. Ruehl
Attorney, Agent, or Firm—Kimmel, Crowell & Weaver

[57] ABSTRACT

A device for measuring force comprising, on the one hand, an upper rigid element (1) and a lower rigid element (2) linked by an elastic body (8), and on the other hand a capacitive sensor independent of the elastic body. The elastic body is made out of a single piece of material by machining a hollow cylinder. The capacitive sensor comprises a plurality of flat electrodes (6, 7) laid out so that different combinations of electrodes enable all 6 degrees of freedom to be measured.

6 Claims, 12 Drawing Figures

DEVICE FOR MEASURING FORCE

FIELD OF THE INVENTION

This invention relates to a force measuring device which enables several components of a generalized force acting upon a solid body to be measured. The device is of the type comprising, on the one hand, two rigid elements connected by elastic means, such as springs, and, on the other hand, measuring means independent of the said elastic connecting means.

The terms 'generalized force' or 'force' are understood to mean both the linear force itself and the torque or moment which act upon one of the rigid elements of the force measuring device, the other element being immobilized.

BACKGROUND OF THE INVENTION

Two types of force measuring devices are currently known. Devices of the first type comprise strain gauges affixed to elastic connecting means; by means of these gauges, the deformation of the elastic connecting means may be measured. Such measuring systems are fragile and unstable; they need to be zeroed frequently, and often have to be recalibrated. The second type of device obviates these drawbacks by making the measuring means independent of the elastic connecting means and enables up to six degrees of freedom to be measured by the relative deformation of two rigid elements. Because the elastic connecting means, in this second type of device, no longer bear the strain gauges, they may be given any shape or size; they may, in particular, be very small or very large in size.

The main disadvantage of all currently known devices of the second type is that they comprise at least as many deformation sensors as degrees of freedom to be measured, each sensor measuring only that component of force which corresponds to its axis. Furthermore, each sensor comprises several parts and has to be very carefully positioned. As soon as several degrees of freedom are to be measured, such devices comprise a large number of components, as a result of the need for a plurality of sensors, and require many mechanical means for adjusting their position.

The present invention overcomes these disadvantages at the same time as providing extremely accurate measurements.

SUMMARY OF THE INVENTION

The present invention is simpler than the prior art and the number of constituent parts is greatly reduced, even if all six degrees of freedom are to be measured, as it comprises only one capacitive sensor.

The elastic body is unusual in that it may be constituted by a machined, hollow or perforated, cylinder, made out of a single piece of material.

The capacitive sensor is composed of two independently movable parts, having no mechanical contact with each other. Integral with each part is a rigid element of the force measuring device. Each of the two halves of the sensor comprises a flat surface bearing a set of flat electrodes, the two parts being affixed to the rigid elements so that the respective smooth surfaces are opposite each other in spaced parallel relation, the electrodes of one surface being separated from those of the other by a dielectric of variable thickness. The electrodes are connected to a monolithic electronic detection circuit, which translates the capacity values into numerical ones.

DESCRIPTION OF THE DRAWINGS

The characteristics and advantages of the invention will become more apparent on reading the following description, which is given by way of example, with reference to the accompanying drawings, wherein.

DETAILED DESCRIPTION OF THE PREFERRED EMBODIMENT

Figure 1:
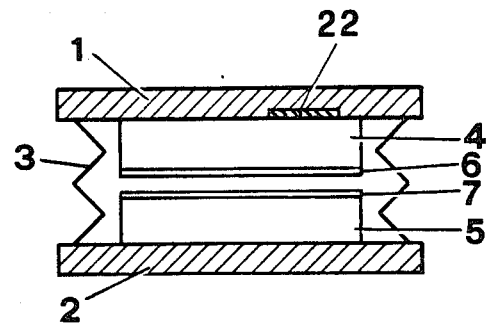
FIG. 1 represents a simplified cross-section of a device according to the invention.

The device according to the invention, as in the simplified representation of FIG. 1, comprises two rigid plates 1 and 2, linked by an elastic body 3, and a capacitive sensor, separate from the elastic body, constituted by two non-conducting disks 4 and 5 having no mechanical contact with each other, each disk being integral with one of the two plates 1 and 2. Each non-conducting disk 4 and 5 comprises a flat surface bearing a set of flat electrodes 6 and 7, the non-conducting disks being affixed to the rigid plates 1 and 2 in such a manner that electrodes 6 are in spaced parallel relation to electrodes 7, separated by a dielectric of variable thickness.

Figure 2:
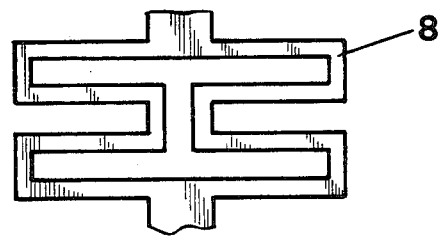
FIG. 2 shows a side view of an elastic member of the device.
Figure 3A:
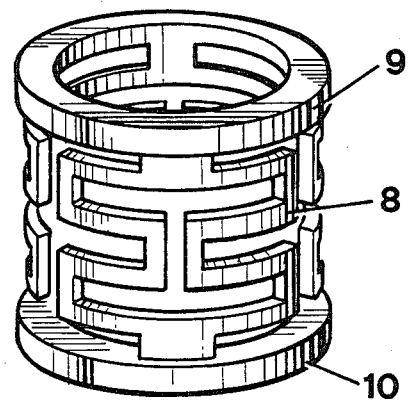
FIGS. 3a and 3b represent two embodiments of the elastic connecting body of the device, seen in perspective.

In a preferred embodiment of the device, the elastic body (see FIG. 3a) is made out of a single piece of material by machining a hollow cylinder, so as to obtain two rigid rings 9 and 10, at the top and bottom, linked by one or several elastic members 8, cut out in angle-bend ribbing as shown in FIG. 2. This embodiment of the elastic body enables it to be produced with the required rigidity. Furthermore, the anchor points of the elastic members 8 are also of the required rigidity as the elastic members are made out of the same piece of material as the top and bottom rings 9 and 10.

Figure 3B:
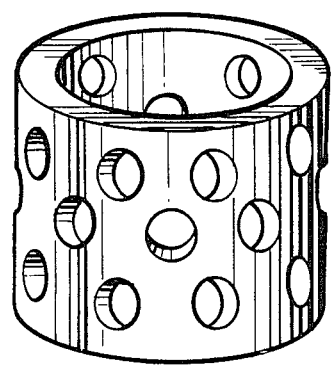

In another embodiment, the elastic body is constituted by a perforated cylinder, also made out of a single piece of material (see FIG. 3b).

The functional of the capacitive sensor, two embodiments of which are given by way of example in FIGS. 8a and 8b and 9a and 9b, is explained hereafter with reference to the diagrams shown in FIGS. 4 through 7.

Figure 4:
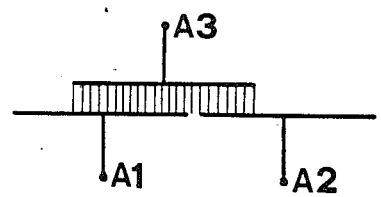
FIG. 4 is a diagram of a differential capacitive sensor suitable for measuring deformation in direction X.
Figure 5:
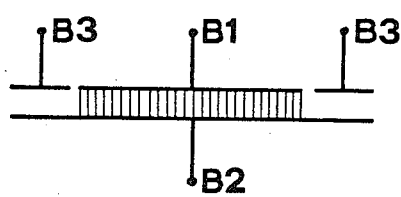
FIG. 5 is a diagram of a proximity capacitive sensor, with guarding electrodes, for measuring deformation in direction Z.
Figure 6:
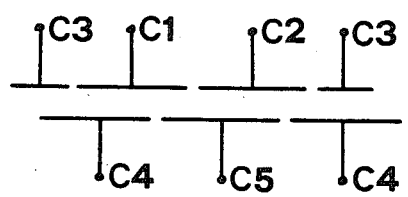
FIG. 6 is a diagram of a capacitive sensor obtained by combining the two previous examples, that will measure deformation in directions X and Z.

The diagrams in FIGS. 4 and 5 show two basic sensors that measure displacement in one direction, the measurement being unaffected by slight displacement in a direction perpendicular to it. The first sensor, measuring horizontal displacement in direction X, is a differential capacitive sensor; the second, measuring displacement in direction Z is a so-called 'proximity' sensor. The diagram in FIG. 6 shows a sensor that works as a proximity sensor of the type shown in FIG. 5 when electrodes C1 and C2 are connected, on the one hand, and electrodes C4 and C5, on the other. In this case, the C3 electrodes act as guarding electrodes. This same sensor can also work as a differential sensor, of the type shown in FIG. 4, when electrodes C1 and C2 are dissociated and the C4 electrodes connected, for example, to a fixed potential, the C5 electrodes carrying an electrical signal.

Various electrode combinations may be obtained by electronic means such as analog switches or transmission gates.

Figure 7:
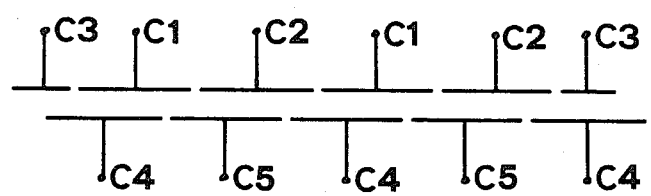
FIG. 7 is a diagrammatic example of an embodiment of a capacitive sensor, comprising a plurality of electrodes along the lines of FIG. 6, which produces a signal of greater amplitude.

The sensor shown in the diagram of FIG. 7 results from an association of several C4 and C5 electrodes on the one hand and C1 and C2 on the other; this combination produces increased signal strength.

Figure 8A:
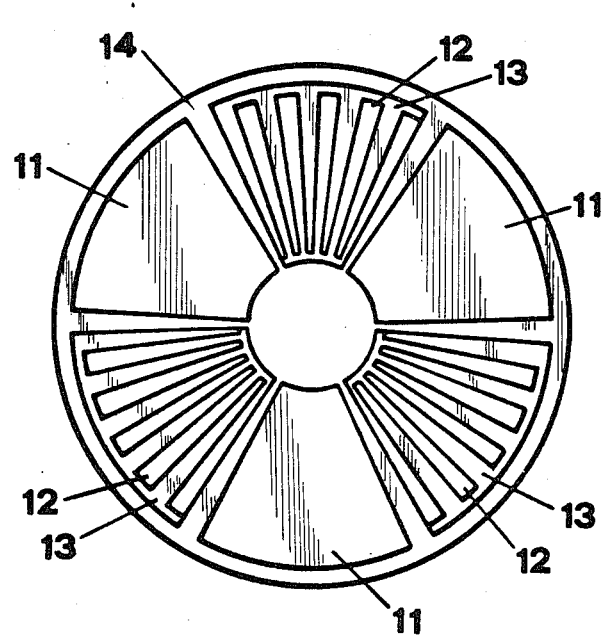
FIGS. 8a and 8b show a possible embodiment of the lower and upper flat electrodes of a device according to the invention.
Figure 8B:
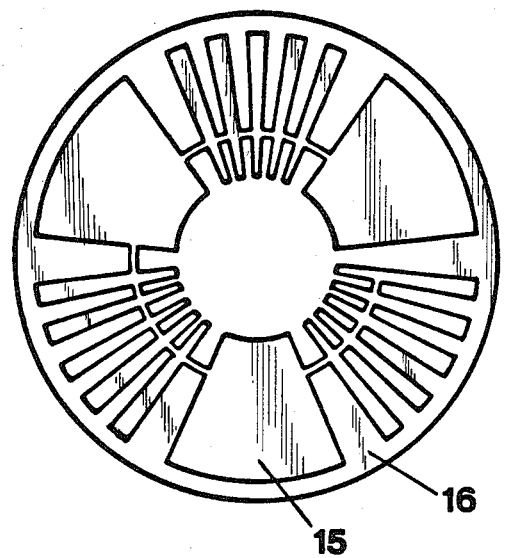

Two embodiments of capacitative sensors will now be described, based on the principles outlined above. The first embodiment is shown in FIGS. 8a and 8b showing the upper non-conducting disk covered by three groups of three electrodes 11, 12 and 13, and FIG. 8b showing the lower non-conducting disk covered by two electrodes 15 and 16. The combination of electrodes 11 with electrodes 15 and 16 associated creates three sensors of the proximity type, with electrode 14 acting as guarding electrode. The combination of electrodes 12 and 13 disassociated with electrodes 15 and 16 disassociated creates three sensors of the differential type.

Figure 9A:
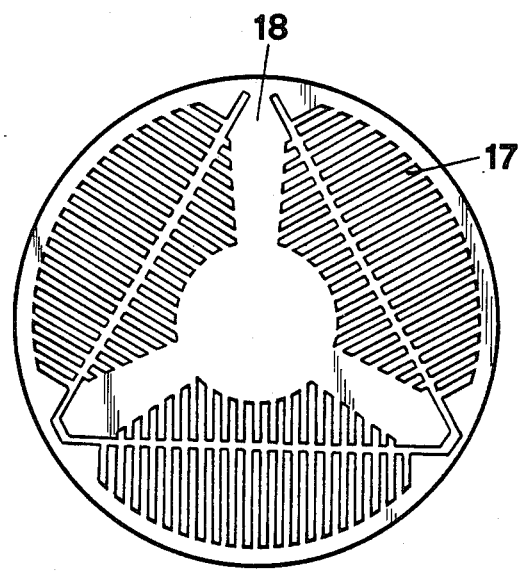
FIGS. 9a and 9b show an alternative, improved, embodiment of these electrodes.
Figure 9B:
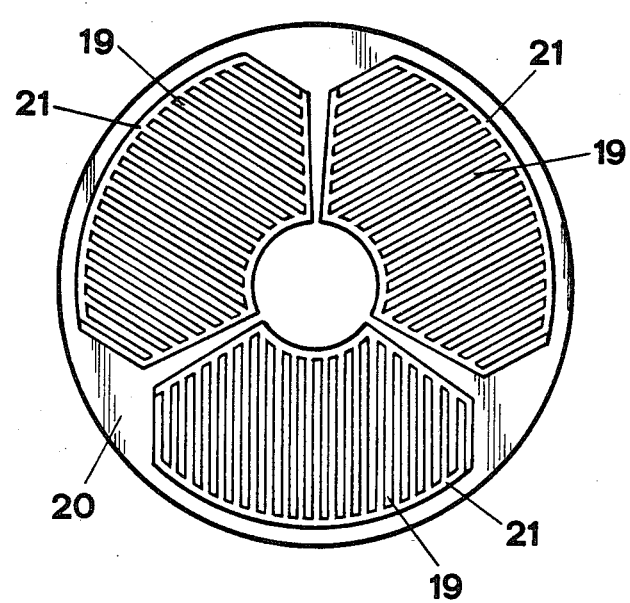

Another, improved, embodiment of capacitive sensors is shown in FIGS. 9a and 9b. The number of electrodes taken into consideration is 7 (instead of 9, in the first embodiment), which decreases the quantity of signals to be processed. Furthermore, the available surface area is exploited more efficiently and the electrode combinations are those shown in FIGS. 6 and 7, resulting in increased amplitude of the signals. In this embodiment, the combination of electrodes 17 with electrodes 19 and 21 disassociated creates sensors of the differential type, whereas the association of electrodes 17 and 18 combined with the association of electrodes 19 and 21 produces sensors of the proximity type, with electrode 20 acting as guarding electrodes.

The technique for making such electrodes is known. They may be produced by depositing a thin layer of chromium over the entire surface of a disk of glass that acts as insulator. The layer of chromium is then separated into the various electrodes by photolithographic means. Another known technique is that used for printed circuits; it consists in depositing a thin layer of copper onto a support of epoxy resin, the separation into the various electrodes being performed by the same process as above.

The signals derived from the various possible electrode combinations are detected and processed by an integrated circuit (IC) 22 which is advantageously incorporated within the device, under the non-conducting disk for example, thus avoiding the interference that might occur were the circuit not placed very close to the electrodes. In addition, the IC benefits from the sensor's own shielding.

The working of such ICs and the algorithms for processing the electrical signals are known. An example will be found in U.S. Pat. No. 4,094,192.

One of the advantages of using a capacitive sensor of the type according to the present invention, compared with an inductive sensor, is that the volume of signals to be processed by the IC is much reduced. In addition, such a sensor is extremely economical to use, especially when measuring displacements comprising several degrees of freedom, since a single sensor will detect all six degrees of freedom, as long as the right combination of electrodes is selected. This capacitive sensor works well in combination with integrated circuits of the CMOS type, for this type of circuit commonly uses both the notion of capacity and transmission gates. Another advantage of this type of circuit is its extremely low consumption of current, enabling it to run from a battery, for example.

What is claimed is:

1. A device for measuring force comprising:
    an upper rigid element and a lower rigid element;
    an elastic body linking the upper and lower rigid elements;
    measuring means, independent of the elastic body and integral with the rigid elements, consisting of at least one capacitive sensor comprising a first part and a second part, each part presenting a flat surface bearing at least one flat electrode, these parts being so placed that the electrodes of the first part are opposite the electrodes of the second part, separated by a dielectric;
    a measuring device connected to the capacitive sensor;
    the capacitive sensor including a plurality of flat electrodes, at least one electrode of one of the two parts of the sensor being laterally displaced in comparison with the electrodes of the other part, so that, depending on the combination of electrode associations and connections, the sensor acts either as a differential sensor or as a proximity sensor; and
    wherein the measuring device comprises electronic means for processing the signals generated by the various electrode combinations and for measuring all the degrees of freedom of movement relative to the two rigid elements.

2. A device as claimed in claim 1 wherein the first part and the second part of the sensor are constituted by non-conducting disks and wherein the electronic measuring means connected to the electrodes is constituted by a monolithic integrated circuit incorporated within the device.

3. A device for measuring force comprising:
    an upper rigid element and a lower rigid element;
    an elastic body linking the upper and lower rigid elements, the elastic body being constituted by a hollow cylinder machined to form two rigid rings at the top and bottom, liked by an elastic member of angle-bend ribbing;
    measuring means, independent of the elastic body and integral with the rigid elements, consisting of at least one capacitive sensor comprising a first part and a second part, each part presenting a flat surface bearing at least one flat electrode, these parts being so placed that the electrodes of the first part are opposite the electrodes of the second part, separated by a dielectric;
    a measuring device connected to the capacitive sensor;

the capacitive sensor including a plurality of flat electrodes, at least one electrode of one of the two parts of the sensor being laterally displaced in relation to the electrodes of the other part, so that, depending on the combination of electrode associations and connections, the sensor acts either as a differential sensor or as a proximity sensor; and wherein the measuring device comprises electronic means for processing the signals generated by the various electrode combinations and for measuring all the degrees of freedom of movement relative to the two rigid elements.

4. A device as claimed in claim 3 wherein the first part and the second part of the sensor are constituted by non-conducting disks and wherein the electronic measuring means connected to the electrodes is constituted by a monolithic integrated circuit incorporated within the device.

5. A device for measuring force comprising:

an upper rigid element and a lower rigid element;

an elastic body linking the upper and lower rigid elements, the elastic body being constituted by a perforated hollow cylinder;

measuring means, independent of the elastic body and integral with the rigid elements, consisting of at least one capacitive sensor comprising a first part and a second part, each part presenting a flat surface bearing at least one flat electrode, these parts being so placed that the electrodes of the first part are opposite the electrodes of the second part, separated by a dielectric;

a measuring device connected to the capacitive sensor;

the capacitive sensor including a plurality of flat electrodes, at least one electrode of one of the two parts of the sensor being laterally displaced in relation to the electrodes of the other part, so that, depending on the combination of electrode associations and connections, the sensor acts either as a differential sensor or as a proximity sensor; and wherein the measuring device comprises electronic means for processing the signals generated by the various electrode combinations and for measuring all the degrees of freedom of movement relative to the two rigid elements.

6. A device as claimed in claim 5 wherein the first part and the second part of the sensor are constituted by non-conducting disks and wherein the electronic measuring means connected to the electrodes is constituted by a monolithic integrated circuit incorporated within the device.

* * * * *